United States Patent [19]
Edie et al.

[11] Patent Number: 5,561,970
[45] Date of Patent: Oct. 8, 1996

[54] AUTOMATED ROBOTIC LENS LOAD SYSTEM

[75] Inventors: Robert J. Edie; Thomas J. Wagner; Michael F. Widman; Joe E. Wilburn, all of Jacksonville, Fla.; Mano Chinnaswamy, West Simsbury, Conn.

[73] Assignee: Johnson & Johnson Vision Products, Inc., Jacksonville, Fla.

[21] Appl. No.: 492,984

[22] Filed: Jun. 21, 1995

[51] Int. Cl.⁶ .............................. B65B 5/08; B65B 35/18
[52] U.S. Cl. ................. 53/473; 53/246; 53/251; 53/254
[58] Field of Search ............. 53/473, 475, 246, 53/244, 247, 251, 250, 249, 255, 254, 431; 414/941; 294/1.2

[56] References Cited

U.S. PATENT DOCUMENTS

| | | | |
|---|---|---|---|
| 3,802,151 | 4/1974 | Baker | 53/251 X |
| 4,594,839 | 6/1986 | De Santis | 53/475 |
| 4,677,808 | 7/1987 | Chenevard | 53/251 X |
| 4,915,368 | 4/1990 | Tsunekawa et al. | 53/246 X |
| 5,214,904 | 6/1993 | De Point et al. | 53/251 X |
| 5,477,663 | 12/1995 | Smith et al. | 53/475 |

*Primary Examiner*—James F. Coan

[57] ABSTRACT

A method of automatically transferring contact lenses from a plurality of cups good positioned at a first location to a plurality of packages positioned at a second location wherein each good cup contains a transferable contact lens for placement in an individual blister package comprises a step of communicating positional information of good cup locations to a robotic device having an arm with one or more end effectors thereon, each end effector having a tip in connection with a vacuum and air pressure supply device, each end effector independently moveable with respect to the arm. Then, steps of applying a vacuum to the end effector tip to enable pick-up of a transferable lens from a cup located at a good cup location, and, controlling the robot to effect positioning of one end effector tip within the cup having the transferable lens therein to pick up the lens are performed. A further step includes controlling the robot to remove the end effector tip from the good cup location to position it within a blister package cavity, and, finally, removing the vacuum and applying air pressure to the end effector tip to deposit the lens from the effector tip into a blister package cavity.

21 Claims, 7 Drawing Sheets

AUTOMATED ROBOTIC LENS LOAD SYSTEM

FIELD OF THE INVENTION

The present invention relates generally to an automatic contact lens transfer system, and, more particularly, to a robotic end effector device having independently movable transfer tips each for individually picking up contact lenses at one location under controlled vacuum conditions, and, placing them at another location under controlled blow-off conditions.

DESCRIPTION OF THE PRIOR ART

Early prior art methods for transferring soft contact lenses from process holding trays into the primary package blisters were essentially manual. The manual lens transfer method (manual lens load or M.L.L.) contained several drawbacks. Besides being very labor intensive, the process was inconsistent since it depended on human operation. Additionally, the number of people involved in the lens transfer process was restricted when production line floor space was limited, therefore resulting in limited throughput. Furthermore, the manual method of lens transfer, which comprised of the implementation of swabs to pick and place the lens, possibly posed an ergonomic threat to the personnel involved. Lastly, the damage to lens was at a level of 3.5 to 15% depending on the experience of the operator.

To overcome the drawbacks to the manual lens transfer method, automatic lens transfer (automatic lens load or A.L.L.) systems were developed that incorporate robotic arms for connection with other process equipment to form an automated cell, each cell having the throughput equivalent of six humans using the manual method. Numerous cells could be used per production line to meet capacity needs and increase throughput. Since the automated method does not use human intervention beyond that of parts feeding, the process is more consistent than the manual lens transfer method and the ergonomic issue was eliminated since the robotic arm does the work.

The critical designs which give prior art A.L.L. systems a competitive edge center around the process of picking up and placing lenses. A robotic arm carries an end effector which has the ability to pull or blow air through small holes placed on the effector tips.

Figure 1:
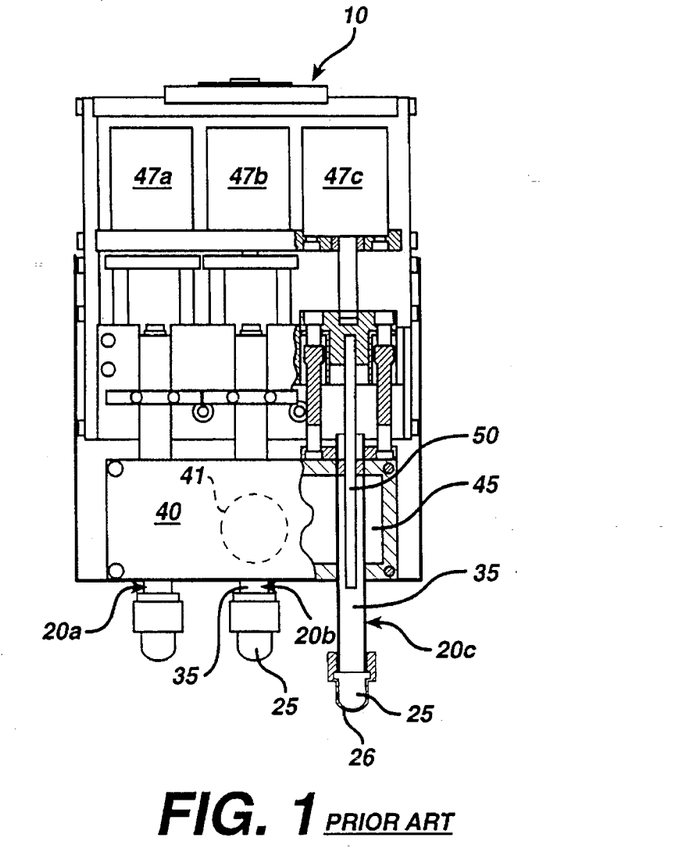
FIG. 1 is a block diagram showing the robotic end effector device and tip for the automatic lens load system of the prior art.

As shown in FIG. 1, a robotic arm of a prior art lens transfer robot carries an end effector assembly 10, having three (3) independently movable end effector tips 20a,b,c, each assembly having a vacuum tube 35 and blowoff tube 50 for respectively pulling or blowing air through small holes placed on the surface 26 of an end effector tip 25. Air cylinders 47a, 47b, and 47b, are commanded by a robotic controller (not shown) to independently extend or retract transfer tips 20a, 20b, and 20c, respectively. To pick up the lens out of the hydration tray, the tip is extended into a tray carrying the hydrated lenses, and a vacuum is created at the vacuum tube 35 of each effector tip by a single vacuum plenum 40 having an interior chamber 45, vacuum connection 41, and vacuum pump (not shown). Essentially, the vacuum plenum pulls hydration solution through the effector tip for a dwell period of approximately 400 milliseconds at a vacuum level of approximately 20 inches of $H_2O$. The cycle is repeated for each effector tip so that after three contact lenses are picked up by respective three end effector tips, the robot arm indexes all three tips over three corresponding primary blister pack cavities for simultaneous lens transfer thereto. After indexing of a lens carrying end effector over a primary blister package, the vacuum supply is turned off and an air supply is turned on to "blowoff" the lens from the tip into an indexed blister cavity. Specifically, for a dwell period of about 200 milliseconds, air at a pressure of approximately 20 psi is supplied to each transfer tip through each blowoff tube 50 to blow the lens off the respective tip 25 for deposition into a blister package cavity. A water separation unit is designed into the system to remove excess solution from the lens at pick up so that it may by deposited without much spray at blowoff. Finally, after lens blowoff, each of the air cylinders 47a,b,c of the effector assembly retract the transfer tips and the cycle is repeated for a new lens pick up.

The design of the end effector allows for three lenses to be picked up, moved, and blown off into the blister, thus, allowing for optimization of throughput given the capacity of the robot arm to carry a load.

Figure 2A:
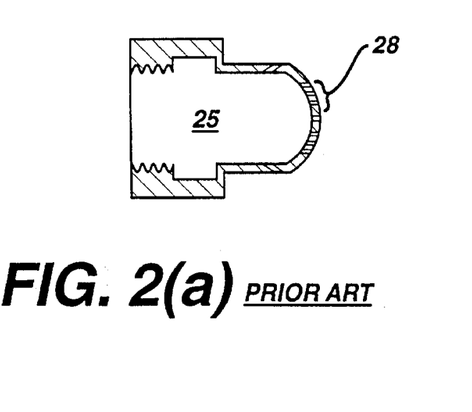
FIG. 2(a) is a cross-sectional view along line "A—A" of the prior art end effector tip assembly of FIG. 2(b) showing the linearly oriented bores.
Figure 2B:
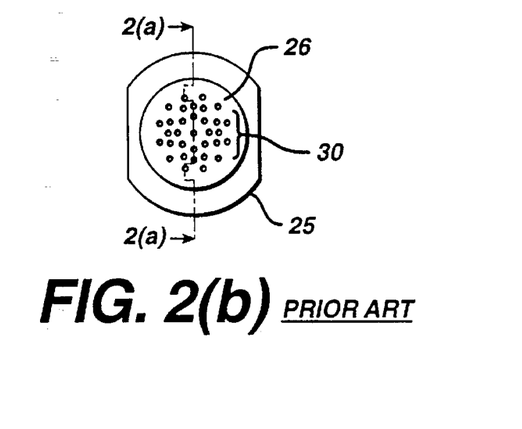
FIG. 2(b) is a frontal view of the prior art end effector tip showing the array of orifices at the tip surface for pulling and blowing air.

The provision of electrical and pneumatic controls used to operate the end effectors are critical features. There are, however, numerous drawbacks to the above-described prior art automatic lens transfer end effector devices, particularly, with respect to the end effector assembly and tips as herein described:

FIG. 2(a) shows a detailed cross-sectional view of the prior art end effector tip 25, and FIG. 2(b) shows a detailed view of the array of orifices 30 at the surface 26 of the tip. As shown in FIG. 2(a), the bores 28 connecting the surface orifices 30 to air and vacuum tube supply (described below) are linear, which, as will be discussed below, provides for the increased possibility of lens transfer failures and requires greater vacuum and air blowoff pressures to effectuate transfers. For example, it is often the case that the lenses are not placed accurately in the receiving container resulting in blister rejection and decreased throughput.

Additionally, the end effector of the prior art uses a first common plenum (or chamber) for the vacuum and a second common plenum for air that was shared by all the end effector transfer tips. The common plenum designs result in fluctuations of vacuum and air (as lenses are picked up and discharged) in the end effector tips, which, in turn, give erratic transfer performance with respect to actually picking up lenses and blowing them off. For example, as shown in FIG. 1, the end effector 20 uses a common plenum 45 for the vacuum and a common plenum (not shown) for air blowoff that is shared by all three end effector transfer tips. The common plenum designs of the prior art result in vacuum and air fluctuations in the end effector tips depending upon how many lenses have been picked. For example, variations in vacuum levels ranging from 20 inches of $H_2O$ to 40 inches of $H_2O$ occur, making process optimization very difficult. Additionally, given the large volume of the end effector tip assembly 25, the linear orientation of the orifices (FIG. 2(a)) and elongated lengths of the blow-off tube, air supply blowoff pressures ranging from 20 psi. to 40 psi. are required to be applied for durations of 200 ms to effect lens blowoff.

It would be highly desirable to provide an end effector tip for a robotic lens transfer device that incorporates a design that allows for individual vacuum and air pressure plenums (or chambers) for each transfer tip for increased control of the vacuum conditions.

It would also be highly desirable to provide an end effector tip that is much smaller in volume and more efficient in terms of controlling vacuum and air blowoff to enable increased lens transfer successes and higher throughputs.

SUMMARY OF THE INVENTION

It is an object of the present invention to provide a robotic lens transfer device for transferring and handling contact lenses that incorporates a design allowing for individual vacuum and air pressure plenums (or chambers) for each transfer tip of the end effector.

Another object of the invention is to provide an automated Lens Load (A.L.L.) system for transferring soft contact lenses from inspection holding trays into the primary package blister in a quick and efficient manner.

Still a further object of the invention is an automated Lens Load (A.L.L.) system that includes a robotic lens transfer device that is provided with intelligence from an upstream lens inspection operation.

Yet another object of the invention is to provide an automated Lens Load (A.L.L.) system wherein the intelligence provided by the upstream lens inspection operation includes a matrix of good/bad lenses that are to be transferred downstream at a lens transfer operation.

Yet a further object of the invention is to provide a control system for a robotic lens transfer device having end effector transfer tips that permits the use of reduced air blowoff values for shorter dwell times to remove the lenses from transfer tips and which is gentler on the lens resulting in far fewer edge defects and more accurate placement.

It is another object of the invention to provide a control system for a robotic lens transfer device that, in conjunction with an inventive robotic end effector tip, allows for the improved consistency of vacuum and air pressure design resulting in increased lens transfer rate, lens positioning, and product yield.

These and other objects of the present invention are attained with a method of automatically transferring contact lenses from a plurality of good cups positioned at a first location to a plurality of packages positioned at a second location wherein each good cup contains a transferable contact lens therein for placement in an individual blister package. The method comprises a step of communicating positional information of the good cup locations to a robotic device having an arm with one or more end effectors thereon, each end effector having a tip in connection with vacuum and air pressure supply means, each end effector independently moveable with respect to the arm. Then, applying a vacuum to the end effector tip to enable pick-up of a transferable lens from a cup located at a good cup location, and, controlling the robot to effect positioning of one end effector tip within the cup having said transferable lens therein to pick up the lens. A further step includes controlling the robot to remove the end effector tip from the good cup location and position the end effector tip carrying the transferable lens within a blister package cavity, and finally, removing the vacuum and applying air pressure to the end effector tip to deposit the lens into a blister package cavity.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENT

Figure 3:
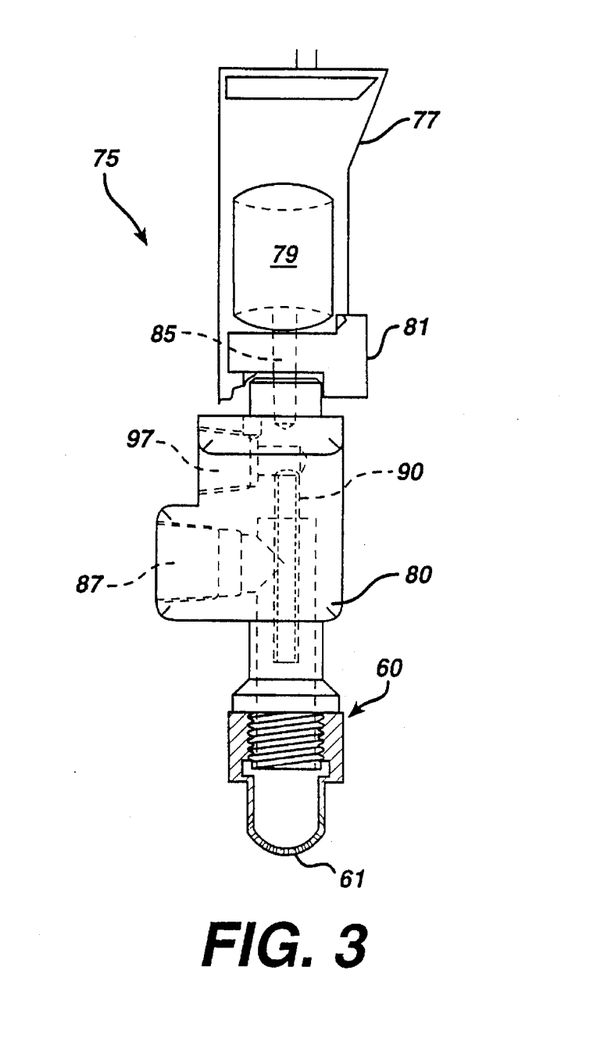
FIG. 3 is a side, partial cross-sectional view of the robotic end effector and end effector tip of the invention.

To overcome the drawbacks in the prior art design, the end effector device 75 of the invention, shown in FIG. 3, is designed to have an individual vacuum plenum for each end effector assembly. As shown in FIG. 3, the end effector assembly 75 of the invention is of a streamlined, integral design of a drastically reduced volume and having a dedicated vacuum plenum for each tip. The advantage of such a design is that the vacuum level for each tip is not effected by what is happening on the other two end effector assemblies, hence, process optimization is easier. For instance, in the end effector of the invention, vacuum levels of a constant pressure are expected with virtually no fluctuation. While vacuum levels of 22 to 30 inches of $H_2O$ may be used, a level of 26 inches of $H_2O$ is preferred.

FIG. 3 illustrates a side, partial cross-sectional view of one transfer lens end effector assembly 75 comprising an lens end effector frame 77, an air cylinder 79 mounted on a shelf 81 of the end effector frame for providing vertical extension and retraction of the end effector tube/plenum assembly 80 and integral lens end effector nozzle tip 60 relative to the frame 77. As shown in FIG. 3 and FIGS. 5(a)–5(f), vertical extension and retraction of the end effector tube/plenum assembly 80 and lens transfer tip 60 is accomplished by the cooperation of air cylinder 79 that is connected to guide shaft 85 at one end and connected with the tube/plenum assembly 80 at the other end.

As shown in FIG. 3, the end effector tube/plenum assembly 80 and lens transfer tip 60 is short in comparison with the prior art tip (FIG. 1) and much lower in volume. The lens transfer tip 60 is integrally connected with an individual vacuum plenum 87, and, comprises a blowoff tube 90 that is also short in comparison with the prior art lens blowoff tube (FIG. 1) and integrally connected with an individual air supply plenum 97.

Figure 4A:
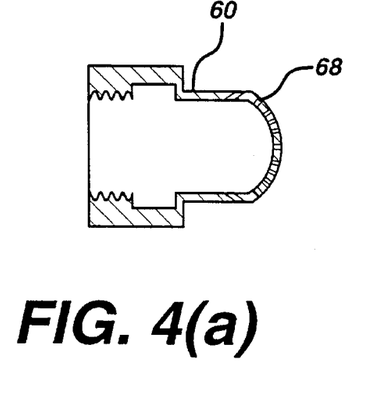
FIG. 4(a) is a cross-sectional view along line "A—A" of the end effector tip assembly of FIG. 4(b) showing the radially oriented bores.
Figure 4B:
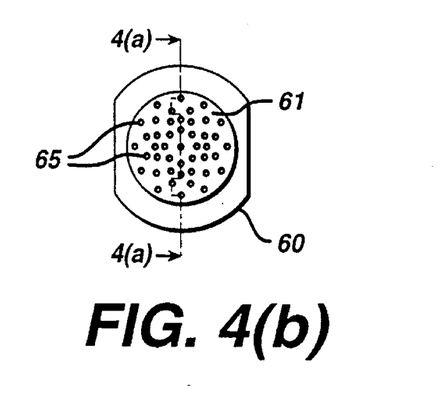
FIG. 4(b) is a frontal view of the end effector tip of the invention showing the array of orifices at the tip surface for pulling and blowing air.

As shown in FIG. 4(a) and 4(b), the lens end effector nozzle tip 60 pulls and blows air through radially oriented holes on a convex surface 61 thereof. FIG. 4(a) shows a detailed cross-sectional view of the improved end effector tip 60, and, FIG. 4(b) shows a detailed view of the array of orifices 65 at the convex surface 61 of the tip. The convex surface 61 is of substantially the same radius as that of the human eye. As shown in FIG. 4(a), the bores 68 connecting the surface orifices 65 with the air and vacuum plenums are oriented radially within the tip 60. The advantages of this radially oriented tip design are that the occurrence of lenses sticking to the tip 60 are dramatically reduced, and the rate of successful transfers is increased due to the fact that the semi-spherical surface of the lens is more responsive to vacuum and blow off pressure emanating from radially oriented orifices of the tip. This is contrary to the prior art linear tip design (FIG. 2(a)) in which the occurrence of lenses sticking to the tip and inaccurate lens placement was increased.

End effector lens transfer movement

Figure 5A:
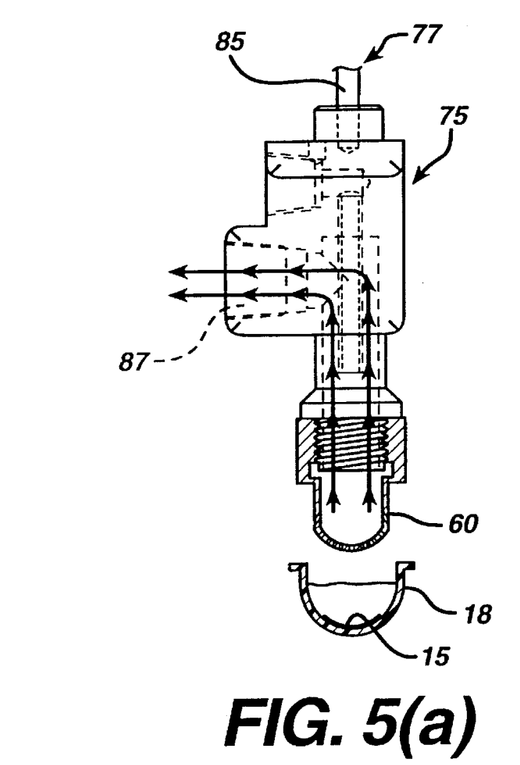
FIG. 5(a) illustrates the positioning of the end effector tip over the hydration cup carrying a good transferrable lens therein with a vacuum applied prior to lens pick.
Figure 5B:
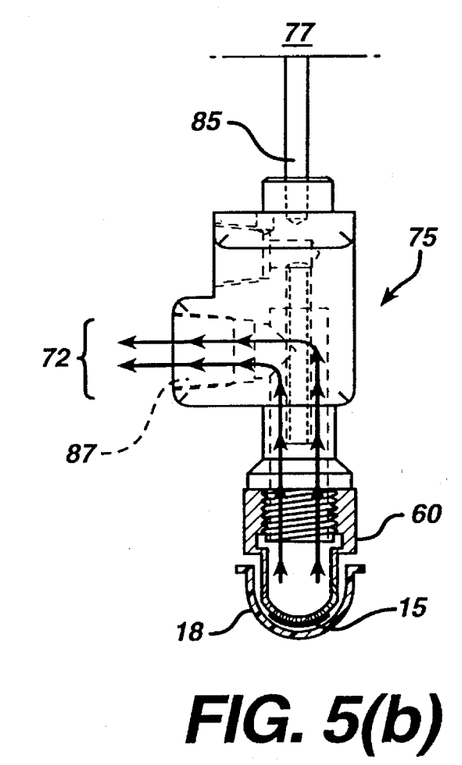
FIG. 5(b) illustrates the extension and dwell of the end effector tip toward and within the hydration cup for removing the contact lens therein.
Figure 5C:
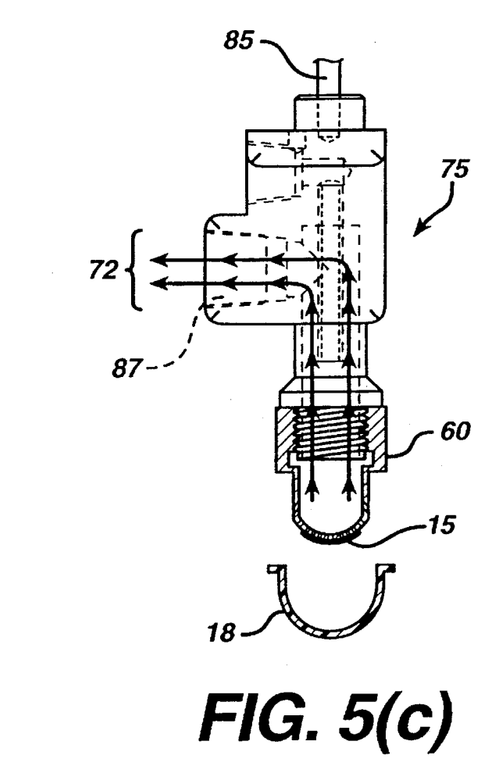
FIG. 5(c) illustrates the retraction of the end effector tip with the vacuum applied after lens pick.

The operation of the robot arm and end effector assembly of the invention, as shown in FIGS. 5(a) through 5(f), is as follows:

First, as shown in FIG. 5(a), the end effector assembly 75 is positioned so that one effector tip 60 is indexed over a contact lens carrying hydration cup 18. At the time of this positioning, a vacuum is applied to the end effector tip. The individual end effector assembly 75 including vacuum plenum 87 is then extended downward all the while controlling speed and deceleration. The robot then remains stationary in the hydration tray cup for a set dwell period, while the lens is sucked up by the applied vacuum onto the tip by vacuum. In the preferred embodiment, the set vacuum dwell period is 60 ms within a desired range of 40 to 100 ms and the suction force that the vacuum pump creates for the end effector tip is preferably approximately 26 inches of $H_2O$ within a desired operation range of 22 to 30 or variation in vacuum pressure inches of $H_2O$ and a net change between lens pick ups of 4 inches of $H_2O$. As shown in FIG. 5(b), the vacuum force is indicated as lines 72, and acts through the effector tip 60 and vacuum nozzle 85 to the vacuum plenum 87 (FIG. 3). The contact lens 15 and hydration solution are picked up (FIG. 5(b)) from the hydration cup 18 and the robot end effector tip is then vertically retracted (FIG. 5(c)) all the while controlling speed and acceleration. This process is repeated two more times until each end effector tip has acquired a lens.

Figure 7:
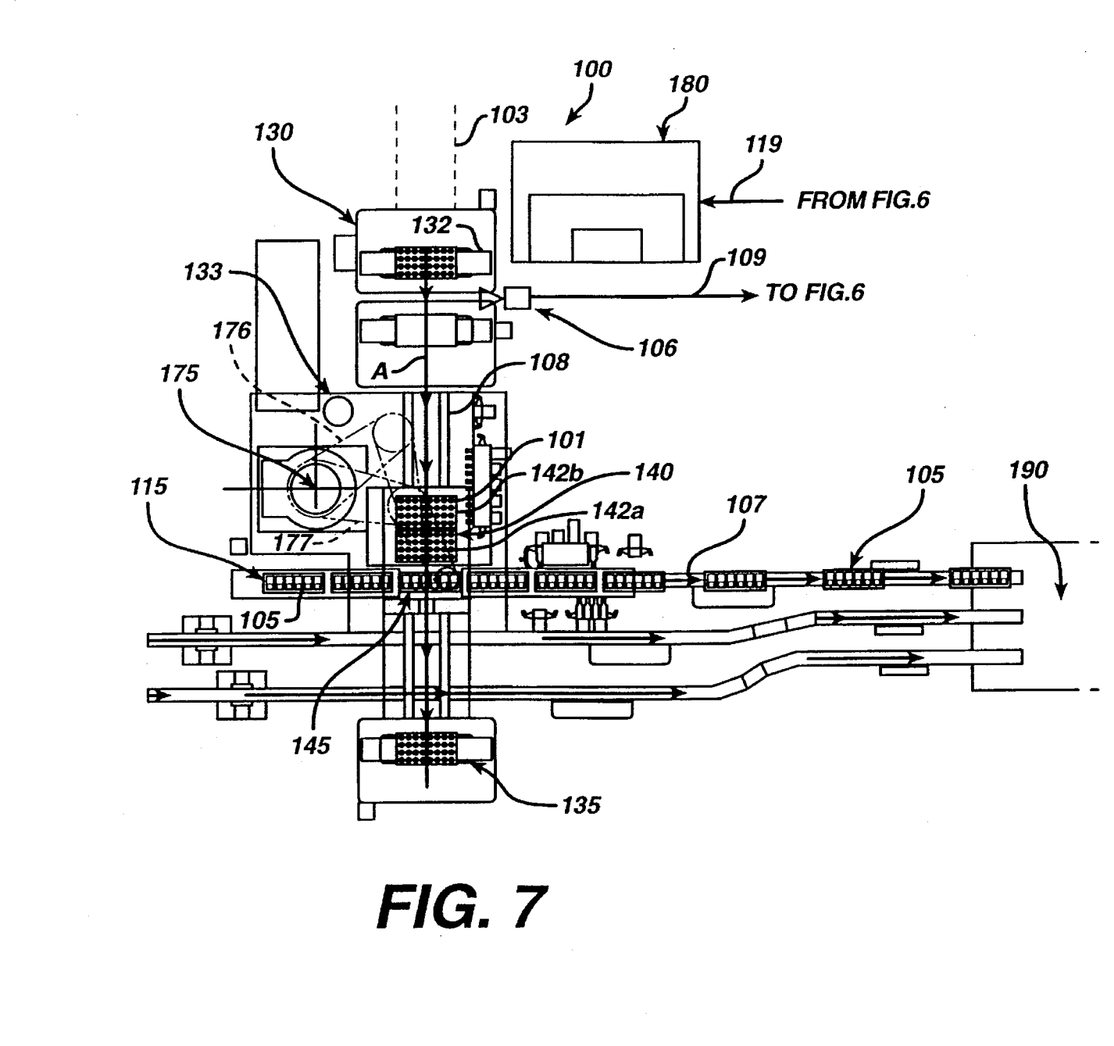
FIG. 7 illustrates an automatic lens load cell wherein robotic arm picks good lenses from the hydration cups at a lens pick location and transfers the lenses to a blister package at a lens place location in the manner as shown in FIGS. 5(a)–5(f).
Figure 8:
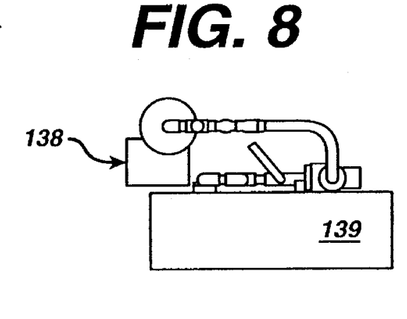
FIG. 8 illustrates the vacuum pump and regulator 138 show mounted proximate the power enclosure 139 for the automatic lens load cell.

As shown in FIG. 7, the excess hydration solution is separated by a water separation apparatus 133 located within the vacuum plenum. In the preferred embodiment, the water separation vacuum plenum 133 is about three (3) liters in volume and has a tube in the bottom (not shown) which allows water coming from the end effector tips to be removed and not ingested in the vacuum pump and regulator 138 to which it is attached. (See FIG. 8). The pump and regulator are positioned adjacent the apparatus illustrated in FIG. 7. In the preferred embodiment, the water separation vacuum plenum has one port attached to the vacuum pump and regulator, and three ports for each respective tip of the end effector.

After three contact lenses 15 are picked up and held by the three end effectors of the robot arm, the robot arm indexes all three end effectors over three corresponding primary blister packages 19 for simultaneous lens transfer thereto. The lens transfer operation for one end effector is shown in FIGS. 5(d) through 5(f).

Figure 5D:
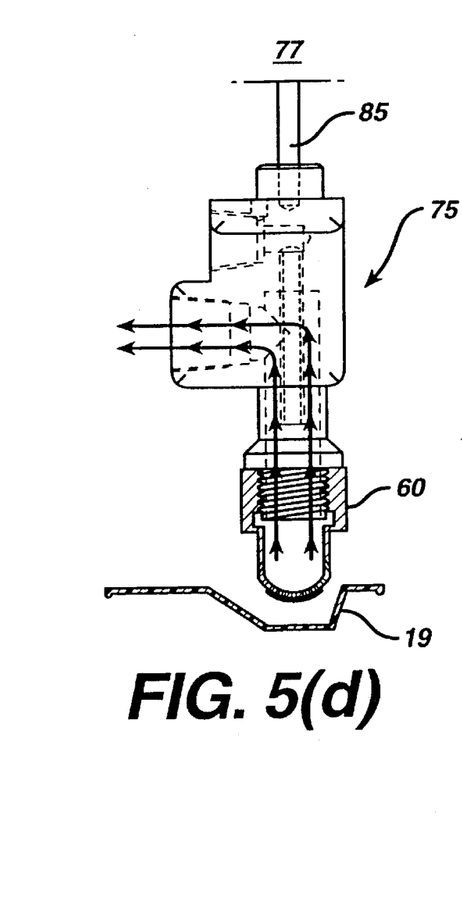
FIG. 5(d) illustrates the extension of the end effector tip within the blister package cavity prior to lens blow-off.
Figure 5E:
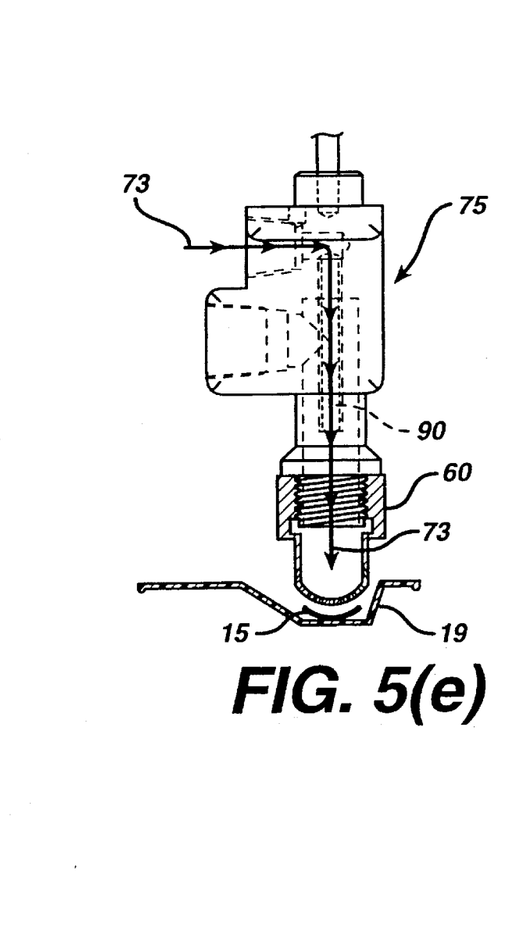
FIG. 5(e) illustrates the dwell of the end effector tip within the blister package cavity and activation of blow-off air pressure to accomplish lens blow-off.

After the robot arm indexes the lens carrying end effector tips over a primary blister package 19 (FIG. 5(d)), with vacuum still applied, the end effector tips are vertically extended into the blister pack cavities to a position fixed above the bottom of the cavity all the while controlling speed and deceleration. The end effector tips remains stationary within respective blister cavities while the vacuum supply used to pick up the lens is turned off. Immediately thereafter, a jet of air, indicated as line 73 in FIG. 5(e), is valved to each tip through blowoff tube 90 for a fixed time period to release the lens from each tip into the blister pack cavity. The blowoff dwell time for the jet of air is approximately 60 milliseconds within a desired range of 20 to 80 ms and the blowoff pressure is about 8 psi, within a desired range of 4 to 12 psi. The tip 60 having radially oriented orifices and operating at these vacuum and air pressure levels enables more accurate blow off, with less possibility of $H_2O$ being blown back into the blister pack. Consequently, there is a marked decrease of rejected blister packages and a corresponding increase in blister package throughput rates.

Figure 5F:
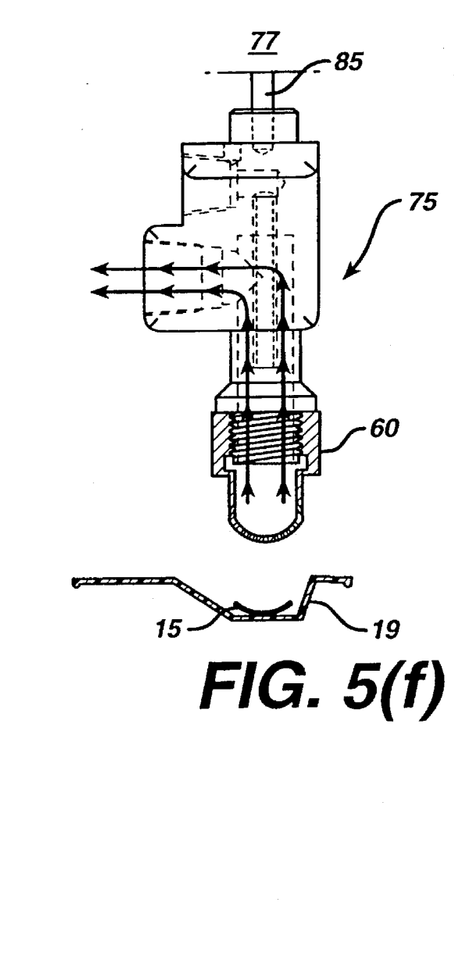
FIG. 5(f) illustrates the retraction of the end effector tip with the vacuum applied after lens placement.

After blowoff, the robot then retracts vertically from the lens load position as shown in FIG. 5(f) all the while controlling speed and acceleration. The vacuum is then re-energized to the tip 60 (FIG. 5(f)) and re-positioned over the hydration cups for the next lens pick cycle.

Automatic lens load system

Figure 6:
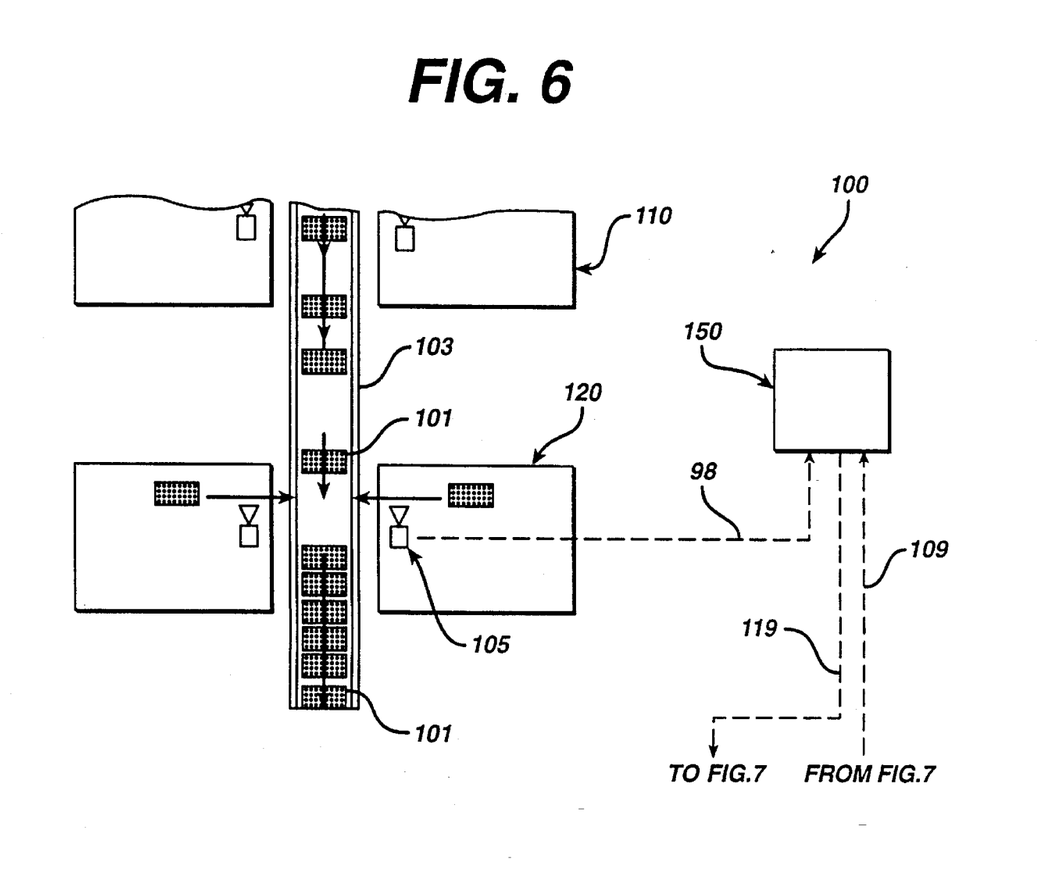
FIG. 6 illustrates the conveyance of hydration cups carrying good/bad lenses out of hydration and lens inspection stations having a bar code identifier thereat.

FIGS. 6 and 7 illustrate a plan view of one automatic lens load cell 100 which contains equipment responsible for transfer of hydration trays to/from the position where the lenses are removed, transfer of Blister Packs to/from the position where the lenses are placed into them, and robotic transfer of the lenses. In the preferred embodiment there are three identical cells for increasing the volume throughput of contact lenses.

As shown in the FIG. 6, a plurality of hydration trays 101 each tray comprising thirty-two (32) hydration cups, each containing an individual contact lens, is conveyed out of a hydration station 110 by conveyor 103 for manual inspection at a lens inspection station 120. In the preferred embodiment, each hydration tray 101 contains cups arranged in a 4×8 matrix and is additionally bar code tagged for identification by a bar code scanner 105 at the lens inspection station. Specifically, the bar code tag is to assure lot integrity and to assign a good lens/bad lens matrix to the particular hydration tray for later transmission to the barcode supervisor computer 150, as shown by broken lines 98 in FIG. 6. As will be explained in greater detail below, when the hydration tray 101 is conveyed downstream for automatic lens transfer, the robot assembly at a lens pick location will pick up only the good lenses remaining in the hydration tray by virtue of the good lens/bad lens matrix assigned to that pallet.

At the lens inspection station 120, the lenses containing defects are identified by operators and the bad lenses are removed from this associated hydration cup.

The hydration trays with the remaining good lens cups, is scanned by a bar code reader 105 to associate the positional information of the removed hydration cups within the 4×8 matrix with the particular tray. This information is transmitted to the supervisor computer 150, which, in the preferred embodiment, is a DEC '486 computer, connected by a STAR node local network. Thus, the supervisor computer 150 stores a data model representative of each tray which includes the tray identification number, lot number, and a matrix of tray locations indicating which tray locations contain lenses which are empty and consequently the locations of good lenses to be transferred.

Tray transfer

As shown in FIG. 7, each hydration tray is conveyed downstream from the lens inspection station to the hydration tray infeed station 130, where they remain in a stacked queue, indicated as 132. In the manner described below, each individual hydration tray is removed (de-stacked) from the stack via an escapement (not shown) located at the bottom of the infeed station 130 and are transported to the lens pick location 140 via a tray transfer conveyor 108 in the direction indicated by arrow "A". In the preferred embodiment, tray transfer conveyor 108 is a twin belt conveyor which are driven by a ⅓ HP, 120 VAC, single phase motor (not shown). As will be explained, all transfer of hydration trays between the positions where destack, reject, lens unload, and up-stack occur is accomplished by the tray transfer conveyor 108.

Tray Destack

During tray destack, a single tray is separated from the remaining stack of trays waiting to be introduced into automatic lens load cell. Tray destack is performed using a tray elevator (not shown) to lower the bottom tray in the stack to the singulate position, then to the transfer position. At the singulate position, destack singulators are used to separate this bottom tray from the remaining trays in the stack.

A tray elevator then performs vertical transfer of hydration trays in either and up or down direction, as required. Preferably, the tray elevator consists of a DC motor connected to a lead screw/nut combination by a timing belt. Rotation of the DC motor shaft causes a rotation in the nut, which in turn drives the lead screw in a vertical direction, up or down, depending on the rotational direction of the motor shaft. The DC Motor is controlled by a four quadrant regenerative drive controller which is a Minarik RG-31OU Regenerative DC Motor Speed Controls.

The tray elevator used for destack is equipped with tray elevator outriggers (not shown) which is an assembly for supporting the outside edges of the hydration tray. This assembly prevents flexing of the hydration tray when force is applied to these outside edges during singulation of a tray.

Two Destack Singulators separate a single hydration tray from the bottom of the stack of trays. Each singulator consists of an air cylinder which, during singulation, moves an escapement horizontally into position to support the one end of the stack of remaining trays, while simultaneously rotating a cam (not shown) to apply a vertical force to one end of the tray being singulated, forcing separation of this tray from the stack.

Bar Code tray identification

As shown in FIG. 7, after a tray is destacked (singulated) for lens unloading, a bar code scanner 106 scans the hydration tray for identification at or near the lens pick station 140. The bar code scanner 106 further transmits the tray identification number via serial link 109 to the supervisor computer 150 (FIG. 6) so that the previously entered lens inspection data 119 for that same tray may be appropriately transmitted back to the robot controller for robot manipulator and end effector tip control.

Tray Reject

If the bar code identifier on the hydration tray was not successfully scanned, the tray is transferred to a tray reject station (not shown) which consists of lifting the tray from the conveyor 108 and pushing the tray onto a latching magazine. Specifically, a tray reject operation is performed using a tray elevator that raises the hydration tray which is to be rejected, pushes up and interlocks with any previously rejected trays, until captivated by an escapement mechanism.

Tray Positioning

For those trays whose identification number could be read, the trays are repeatedly positioned and physically located for lens removal. Specifically, lens unload tray positioning involves a tray elevator that raises the hydration tray to allow the Lens Unload Tray Positioners (not shown) to locate the tray at a repeatable position for unloading lenses.

A tray elevator, as described above, performs vertical transfer of the hydration trays in either an up or down direction, as required, and consists of a DC motor connected to a lead screw/nut combination by a timing belt. However, the tray elevator used at the lens unload position is not equipped with tray elevator outriggers.

In the preferred embodiment, two (2) lens unload tray positioners (not shown) are used to position each hydration tray for unload at respective two lens unload locations 142*a* and 142*b* as shown in FIG. 7, therefore, a total of four (4) positioners. A single Lens Unload Tray Positioner consists of an air cylinder which guides a positioning wedge under one side of the hydration tray. During engagement, the positioning wedge uses three (3) features to repeatedly position an hydration tray in the robot's X, Y and Z axis. The Z-Axis Wedge drives the hydration tray in the robot's X, Y and Z axis. The Z-Axis Wedge drives the hydration tray up into positioning rails (not shown), the Y-Axis Wedge centers the hydration tray, and when completely engaged, the hydration tray is captivated between the X-Axis Blocks.

Tray Up-stacking

As shown in FIG. 7, after all of the lenses have been removed by the robot end effector in the manner described above with respect to FIGS. 5(*a*)–5(*f*), the empty tray is lowered to the tray transfer conveyor 108 for transference to the hydration tray up-stacker station 135 where the tray is lifted from the conveyor 108 for loading onto a latching magazine.

The tray up-stack pushes the recently emptied tray into the stack of trays which were processed previously. Specifically, the tray stack operation uses a tray elevator, in the manner described above, to raise the hydration tray which is to be rejected, pushing up and interlocking with any previously rejected trays, until captivated by an escapement mechanism.

Blister transfer

As shown in FIG. 7, simultaneous with the conveyance of the hydration pallets as discussed above, individual blister packages are introduced into the automatic lens load cell from the bottom of a blister pack dispenser (not shown) which may comprise a conventional stacking and dispense mechanisms for removing individual blister packs at a blister dispense station 115. Specifically, as shown in FIG. 7, the blister pack 105 is dispensed onto a blister transfer index conveyor 107 that, as will be explained in further detail below, transfers blister packs between the dispense position, load positioning, inspection, and rejection. Preferably, the blister transfer index conveyor 107 consists of a DC gearmotor, connected to the input shaft of a mechanical cam index mechanism. A single rotation of this input shaft is broken down into two functional segments, a 270 degree index segment, and a 90 degree dwell segment. During the 270 degree index segment, the output shaft of the index mechanism performs two complete rotations. During the 90 degree dwell segment, the output shaft remains stationary. The output shaft of the index mechanism drives a continuous belt which is equipped with flexible lugs spaced at 12 inch centers and used to push the blister packs along the guide rails, twelve inches at a time.

As mentioned above, the blister packs 105 are indexed to the lens place location 145 where the blister pack is clamped down, the lens cavities are supported from below, to position the blister pack to receive three lenses from the robot end effector assembly in the manner described above. Specifically, the positioning of the Blister Packs at the repeatable lens place location 145 for lens placement by the robot is accomplished by a lens load positioner (not shown). After a new blister pack 105 has been indexed into the approximate lens load position by the blister transfer index conveyor 107, an air cylinder moves a positioning plate (not shown) in a downward direction to position the blister pack. During this downward motion, four (4) bullet shaped positioning pins (not shown) insert into "dimples" in the blister pack, moving the blister pack from the approximate to the final lens load position, and insuring a repeatable position in the X/Y plane of the robot. When this downward motion has completed, the positioning plate is forcing the bottom surface of each of the six Blister "cavities" (where the lenses are placed) against the Cavity Support, insuring a repeatable robot Z axis location of the bottom surface of the blister cavities.

Since a blister package comprises six primary package cavities, two pick/place lens placement sequences are performed, after which, the positioning clamp is released to allow the blister pack index to a subsequent blister inspection station (not shown) for optical verification that a lens has been placed in each of the six (6) positions in the blister pack 105. If the presence of six lenses is not verified, a reject gate (not shown) positioned along the conveyor 107 diverts the deficient blister pack 105 to a reject belt conveyor (not shown) during the next index. Preferably, the blister reject gate consists of an air cylinder (not shown) which when retracted, causes fingers of the reject gate to lower, with the tips of these fingers entering mating notches in the blister transfer guide rails. When the next index occurs, the failed blister pack is pushed up onto the fingers. At this time, the air cylinder extends, causing the fingers (which are supporting the blister pack) to raise until the reject gate is parallel with the reject conveyor.

Blister packages which are not rejected are indexed onto a continuous running flat topped flexible link end of line conveyor system to transfer each the blister pack to the heat seal area 190 where foil is sealed to the open faces of the blister packs.

Robot Assembly

As shown in FIG. 7, a robot 175, which, in the preferred embodiment, is an Adept One® four (4) axis robot, includes the above-described end effector device 75 mounted on the end of a Z-axis quill assembly (not shown) for removing lenses three at a time from the hydration trays at the lens pick location 140 for placement into the blister package at the lens place location 145. FIG. 7 illustrates the robot 175 in a first lens pick position 176 and a second lens place position 177 as commanded by the auto lens load robot controller 180 which controls all of the robot's movements, and, in the preferred embodiment is an Adept A-series microcontroller. Preferably, the robot controller 180 receives the good lens/bad lens matrix data 119 from the supervisor computer 150, and, in a manner known to those skilled in the art, instructs the robot 175 and end effector assembly 75 to pick up three good lenses at a time from the hydration tray 101 at the lens pick position. As shown in FIG. 7, a bar code scanner 106 is positioned to scan the hydration tray for identification at or near the lens pick station 140 and further transmits the tray identification number 109 to the supervisor computer 150 so that the previously entered lens inspection data 119 for that same tray is appropriately transmitted back to the robot controller for robot and end effector control. In the preferred embodiment, the supervisor computer is connected to each bar code reader as well as the robot and inspection controllers via a STAR node. If the bar code identifier on the hydration tray was not successfully scanned during destack, the tray is transferred to the Tray Reject Station. Tray Reject consists of lifting the tray from the conveyor, pushing the tray into a latching magazine. Additionally, via RS-232 serial links, the supervisor computer controls the all the vacuum and lens blow-off dwell times for the robot end effector tips and all power for the lens load system is distributed from the electrical supply box 139 to power the hydration tray de-stacker and up-stacker elevator motors (not shown), the blister package transfer index motor and conveyor (not shown), the vacuum pump and end of line conveyor motors, etc.

Robotic Control System

As shown in FIG. 7, the robotic control system for each automated lens load cell includes an Adept MC controller 180 for controlling the robot manipulator used to transfer the lenses. The manipulator is an Adept One, 4-axis, servo driven, SCARA robot equipped with optional Hyperdrive.

Software Architecture

The software developed to control the equipment contained within the cell consists of up to sixteen (16) separate concurrent "tasks" on the Adept V+ Operating System/Programming Language. A "task" is a single program executing continuously. All sixteen tasks are prioritized and scheduled to share a portion of the execution time of each processor major cycle (each major cycle is 16 msec in duration) thus giving the effect that all tasks are executing simultaneously. The following sections provide an overview of the major equipment which is controlled by, or communicates to, the Adept Controller.

Figure 9:
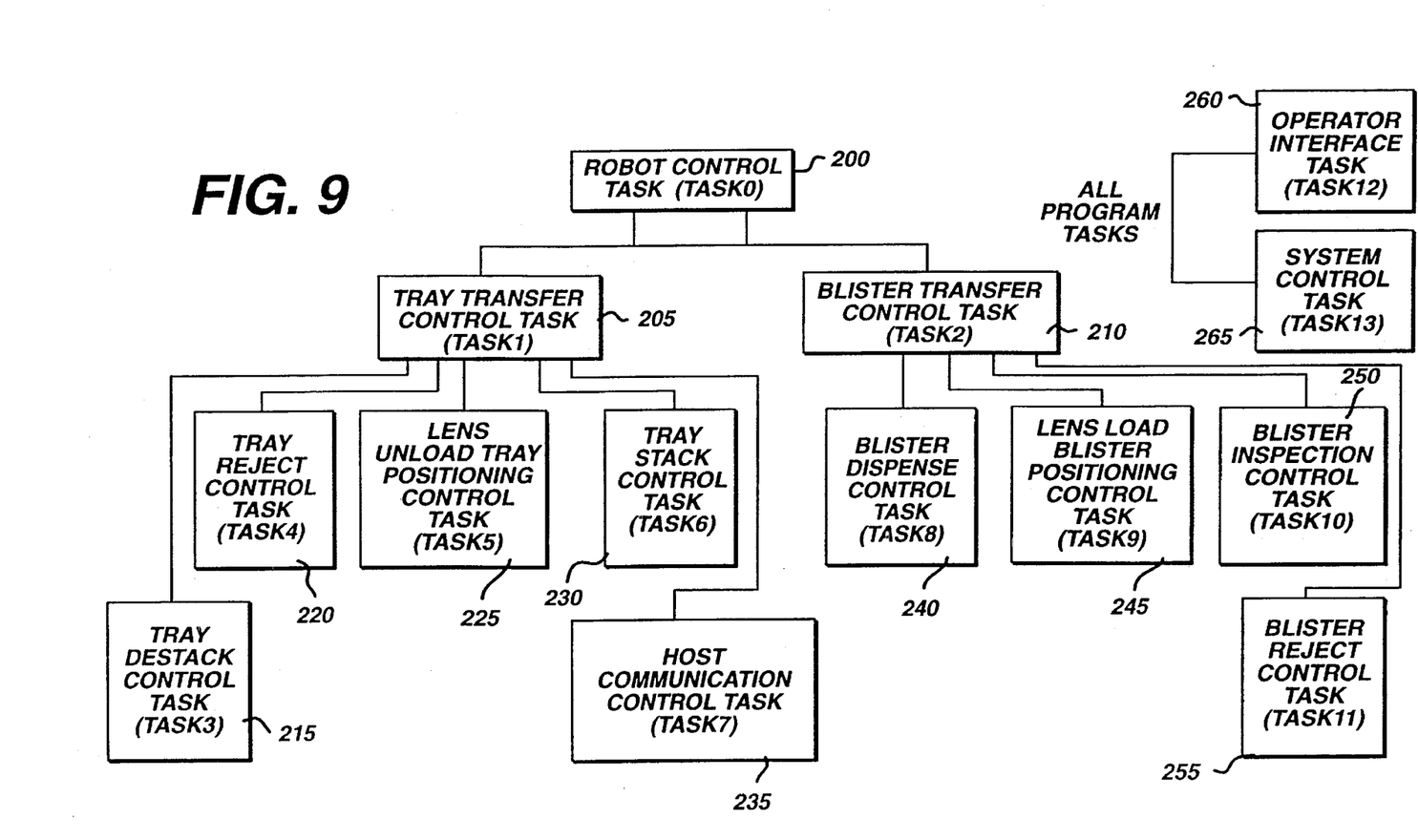
FIG. 9 illustrates presents a block diagram representation of the software architecture for controlling the operations of an automated lens load cell.

In the preferred embodiment, the Automated Lens Load System uses fourteen (14) of these tasks to control the operations associated with each cell. Each task has been assigned a specific control responsibility, and "soft" signal communication and global data structures are used to allow intertask communication. FIG. 9 presents a block diagram representation of this software architecture with each task represented as a block in the diagram. Connections between the blocks represent a communications link between the two tasks connected. Each task and any associated intertask communication is described in further detail in the following sections.

Robot Control Task

The Robot Control Task 200 is responsible for controlling all operations involving transfer of lenses using the Robot Adept manipulator. This task communicates with the Tray Transfer Control Task 205 and the Blister Transfer Control Task 210 2) to request new Inspection Trays to remove lenses from, and new Blister Packs to place them into, respectively.

Tray Transfer Control Task

The Tray Transfer Control Task 205 is responsible for supervisory control of all Inspection Tray operations. This task responds to "soft" signal communications requests for trays from the Robot Control Task 200. When a new tray is requested, this task then communicates with the Tray Destack 215, Tray Reject 220, Lens Unload Tray Positioning 225, Tray Stack 230 and Host Communications Control Tasks 235 to control the timing of these individual operations. After this task receives indication that all active operations involving these sub-tasks is complete, this task controls the transfer of trays along the Tray Transfer Conveyor 103 (FIG. 7).

Blister Transfer Control Task

The Blister Transfer Control Task 210 is responsible for supervisory control of all Blister Pack operations. This task responds to "soft" signal communications requests for new blister pack from the Robot Control Task 200. When a new blister pack is requested, this task then communicates with the Blister Dispense task 250, Lens Load Blister Positioning task 255, Blister Inspection task 260, and Blister Reject Control Task 265 to control the timing of these individual operations. After this task receives indication that all active operations involving these sub-tasks is complete, this task controls the transfer of Blister Pack along the Blister Index Conveyor and onto the End of Line Conveyor.

Tray Destack Control Task

The Tray Destack Control Task (Task3) is responsible for controlling all operations associated with the Tray Destack Station. When the Tray Transfer Control Task requests that a new tray be destacked, this task controls all of the equipment associated with this operation, and responds back to the Tray Transfer Control Task when the destack operation has been completed.

Tray Reject Control Task

The Tray Reject Control Task (Task4) is responsible for controlling all operations associated with the Tray Reject Station. When the Tray Transfer Control Task requests that a tray be rejected, this task controls all of the equipment associated with this operation, and responds back to the Tray Transfer Control Task when the reject operation has been completed.

Lens Unload Tray Positioning Control Task

The Lens Unload Tray Positioning Control Task 225 (Task5) is responsible for controlling all operations associated with the Lens Unload Tray Positioning Station. When the Tray Transfer Control Task requests that either an empty tray be removed from, or a new tray be supplied to, Lens Unload Tray Position 'A' or 'B', this task controls all of the equipment associated with these operations, and responds back to the Tray Transfer Control Task when the requested operation has been completed.

Tray Stack Control Task

The Tray Stack Control Task 230 (Task6) is responsible for controlling all operations associated with the Tray Stack Station. When the Tray Transfer Control Task requests that a tray be stacked, this task controls all of the equipment associated with this operation, and responds back to the Tray Transfer Control Task when the stack operation has been completed.

Host Communications Task

The Host Communications Task 235 (Task7) is responsible for serial communication with the Host Computer to obtain information about each tray which has been passed through the bar code reader during the destack operation. When the Tray Transfer Control Task requests that a tray be destacked, and this operation has been completed, this task initiates communications with the Host Computer to determine if the tray identification number was not successfully read ("Tray Unscannable"), successfully read but not a member of the current lot ("Tray Bad"), or successfully read with associated lens location data ("Tray Good"). If a "Tray Good" response was received, the global lens location data structure is updated with an associated series of 32 pass/fail indicators which reflect the status of each of the 32 potential lens locations in the tray. This task then responds back to the tray transfer control task when the Host Communications sequence has been completed.

Blister Dispense Control Task

The Blister Dispense Control Task 240 (Task8) is responsible for controlling all operations associated with the Blister Dispense Station. When the Blister Transfer Control Task requests that a new blister Pack be dispensed onto the Blister Transfer Index Conveyor, this task controls all of the equipment associated with this operation, and responds back to the Blister Transfer Control Task when the dispense operation has been completed.

Lens Load Blister Positioning Control Task

The Lens Load Blister Positioning Control Task 245 (Task9) is responsible for controlling all operations associated with the Lens Load Blister Positioning Station. When the Blister Transfer Control Task requests that either a filled Blister Pack be released from, or an empty Blister Pack be positioned at, the Lens Load Blister Position, this task controls all of the equipment associated with these operations, and responds back to the Blister Transfer Control Task when the requested operation has been completed.

Blister Inspection Control Task

The Blister Inspection Control Task 250 (Task10) is responsible for controlling the interface with the Blister Inspection System. When the Blister Transfer Control Task requests that a Blister Pack be inspected, this task controls the digital I/O communication with the Blister Inspection System (supplied by Vistakon). After Blister Inspection has been completed, and the pass/fail results received from the Blister Inspection System, this task communicates this information to the Blister Transfer Control Task.

Blister Reject Control Task

The Blister Reject Control Task 255 (Task11) is responsible for controlling all operations associated with the Blister Reject Station. When the Blister Transfer Control Task requests that a Blister Pack be rejected from the Blister Transfer Index Conveyor, this task controls all of the equipment associated with this operation, and responds back to the Blister Transfer Control Task when the reject operation has been completed.

Operator Interface Task

The Operator Interface Task 260 (Task12) controls all of the System Message operations. In particular, this task controls the communication of message text to the two alpha-numeric displays located on the Operator Interface, and Power Distribution Enclosure. In addition, this task controls all related operations such as Message Advance, Alarm Silence, and Message Acknowledge functions. All tasks communicate to the Operator Interface Task using global data structures to report new messages and request clearing of active messages.

System Control and Monitor Task

The System Control and Monitor Task 265 (Task13) control all cell operations which are not specific to a particular task. These functions include Cell Start-up in Automatic or Manual Mode, Cell Reset, End of Lot Purge, and Cycle Start/Stop. In addition, this task handles interruptions in normal cell operations due to Loss of Air Pressure or Control Power, and operating/closing of safety enclosures.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed:

1. A method of automatically transferring contact lenses from a plurality of cups located at a first location to a plurality of packages previously positioned at a second location, each said cup containing a transferable contact lens therein for placement in an individual package, said method comprising the steps of:
   (a) communicating positional information of good cup locations station to a robotic device having an arm with one or more end effectors thereon, each end effector having a tip in connection with a corresponding vacuum supply and air pressure supply means, said one or more end effectors each independently moveable with respect to said arm;
   (b) applying a predetermined vacuum level of 22 to 30 inches of $H_2O$ to said end effector tip to enable pick-up of a transferable lens from a cup located at a good cup location;
   (c) controlling said robot to effect positioning of one end effector tip within said cup having said transferable lens therein to pick up said transferable lens;
   (d) controlling said robot to remove said end effector tip from the good cup location and position said end effector tip carrying said transferable lens within a blister package cavity location;
   (e) removing said vacuum and applying air pressure by said air pressure supply means to said end effector tip to deposit said lens into said blister package cavity.

2. The method of automatically transferring contact lenses as claimed in claim 1 wherein the step (b) of applying a vacuum includes applying a vacuum of about 26 inches of $H_2O$.

3. The method of automatically transferring contact lenses as claimed in claim 2 wherein the vacuum applied of 26 inches of $H_2O$ remains constant within ±4 inches of $H_2O$.

4. The method of automatically transferring contact lenses as claimed in claim 1 wherein the step (e) of applying said air pressure includes applying an pressure in the range of 4 to 12 psi.

5. The method of automatically transferring contact lenses as claimed in claim 4 wherein the step of applying said air pressure includes applying a pressure of about 8.0 psi.

6. The method of automatically transferring contact lenses as claimed in claim 2 wherein the step (c) of controlling said robot to effect positioning of said end effector tip within said cup means positions said tip for a predetermined vacuum dwell time of 40 to 100 milliseconds.

7. The method of automatically transferring contact lenses as claimed in claim 6 wherein said predetermined vacuum dwell time is about 60 milliseconds.

8. The method of automatically transferring contact lenses as claimed in claim 4 wherein the step (c) of controlling said robot to effect positioning of said end effector tip within said blister package cavity positions said tip for a predetermined blow-off dwell time of 20 to 80 milliseconds.

9. The method of automatically transferring contact lenses as claimed in claim 8 wherein said predetermined blow-off dwell time is about 60 milliseconds.

10. A contact lens transfer device particularly adapted to transfer wet soft contact lenses from a first location to a second location, said contact lens transfer device comprising:
    (a) an input registration device for registering a plurality of first contact lens carriers in a predetermined x-y array, each of said carriers having a contact lens therein,
    (b) an output registration device for registering a plurality of second contact lens carriers in a predetermined x-y array, each of said carriers adapted to receive a contact lens therein,
    (c) a robotic transfer device, said device having a transfer head with a plurality of individually actuable end effectors mounted thereon, each end effector having,
       (i) an individually actuable drive for reciprocating said end effector from a first transport position to a second pick-up and release position,
       (ii) individually valved vacuum and air pressure supply lines for each end effector to supply negative and positive pressure to a low volume plenum in said end effector for pick-up and release of individual contact lenses,
       (iii) a convex lens transfer tip mounted on each end effector, each tip having a plurality of openings therein to provide negative and positive pressure to a concave side of said soft contact lens,
    (d) a control computer for receiving x-y positional data for each of said plurality of contact lens carriers, and selectively actuating said robotic transfer device, one of said individually actuable drives and one of said individually valved vacuum supply lines associated with said drive to pick-up a contact lens from one of said plurality of contact lens carriers.

11. A contact lens transfer device as claimed in claim 10, wherein said first contact lens carriers are good lens cups, each of said cups having a contact lens therein which has met predetermined inspection parameters.

12. A contact lens transfer device as claimed in claim 10, wherein said second contact lens carriers are individual blister packages intended for packaging of the contact lens.

13. A contact lens transfer device as claimed in claim 12, wherein said blister packages are provided in a predetermined array.

14. A contact lens transfer device as claimed in claim 10, wherein said robotic transfer device is a four axis robotic drive.

15. A contact lens transfer device as claimed in claim 10, wherein said transfer head further includes three individually actuable end effectors.

16. A contact lens transfer device as claimed in claim 10, wherein said each end effector includes a vacuum plenum connected to one of said individually valved vacuum lines.

17. A contact lens transfer device as claimed in claim 16, wherein each end effector also includes a blow off tube that extends through said vacuum plenum, said blow off tube being connected to one of said individually valved air pressure supply lines.

18. A contact lens transfer device as claimed in claim 17, wherein each end effector further includes a low volume common plenum between said lens transfer tip and said blow off tube.

19. A contact lens transfer device as claimed in claim 10, wherein said control computer further actuates said individually actuable drive and said robotic transfer drive to move a contact lens from said first location to said second location.

20. A contact lens transfer device as claimed in claim 10, wherein said control computer further actuates said individually actuable drive and one of said individually valved air pressure lines to release a contact lens into said second contact lens carrier.

21. A contact lens transfer device as claimed in claim 11, wherein each of the openings in said convex tip is formed along a radius of said convex surface.

* * * * *